US 8,220,799 B2

(12) United States Patent
Pompei et al.

(10) Patent No.: US 8,220,799 B2
(45) Date of Patent: Jul. 17, 2012

(54) TRANSACTION PRODUCT WITH FOLDABLE SHEET

(75) Inventors: Alicia Pompei, Minneapolis, MN (US); Jonathan Erickson, Hudson, WI (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 12/610,300

(22) Filed: Oct. 31, 2009

(65) Prior Publication Data

US 2011/0101611 A1 May 5, 2011

(51) Int. Cl.
*A63F 3/00* (2006.01)
(52) U.S. Cl. .......................................... 273/285; 273/287
(58) Field of Classification Search ................... 273/285, 273/286, 287
See application file for complete search history.

(56) References Cited

U.S. PATENT DOCUMENTS

| | | | |
|---|---|---|---|
| 1,343,984 A | 6/1920 | Ramsey | |
| 1,687,304 A * | 10/1928 | Morris | .............................. 281/5 |
| 2,458,729 A | 1/1949 | Politzer | |
| 2,525,937 A | 10/1950 | Palm | |
| 2,876,012 A | 3/1959 | Allen, Jr. | |
| 4,140,317 A | 2/1979 | Ramney | |
| 4,620,725 A | 11/1986 | Maehashi | |
| D301,346 S | 5/1989 | Sjöstrand et al. | |
| 4,826,212 A | 5/1989 | Muth et al. | |
| 4,988,110 A | 1/1991 | Zuckerman et al. | |
| 5,018,728 A * | 5/1991 | Liss | .............................. 273/459 |
| 5,096,204 A * | 3/1992 | Lippman | ........................ 273/285 |
| 5,100,151 A * | 3/1992 | Lyon et al. | ..................... 273/285 |
| 5,110,135 A | 5/1992 | Weber | |
| 5,156,898 A | 10/1992 | McDonald | |
| 5,308,118 A * | 5/1994 | Ovadia | ............................ 283/56 |
| 5,308,121 A | 5/1994 | Gunn | |
| 5,351,991 A | 10/1994 | McDonald | |
| 5,454,644 A | 10/1995 | Augustin | |

(Continued)

FOREIGN PATENT DOCUMENTS

GB 2277482 A 11/1994

OTHER PUBLICATIONS

Z-Format PocketMedia® Solutions for all market Sectors, http://www.zcard.com/pocketmedia/z-format.php, Admitted Prior Art (undated).

(Continued)

*Primary Examiner* — Vishu K. Mendiratta
(74) *Attorney, Agent, or Firm* — Griffiths & Seaton PLLC

(57) ABSTRACT

A transaction product includes a first cover panel, a second cover panel, and an intermediate sheet, and an account identifier. The intermediate sheet transitions between a collapsed and an extended position and defines fold lines dividing the intermediate sheet into sections. When the intermediate sheet is in the collapsed position, the sections form a stack. The first cover panel is coupled with one of the sections that forms a top of the stack, and the second cover panel is coupled with another of the sections that forms a bottom of the stack. The account identifier is coupled with at least one of the first and second cover panels and the intermediate sheet and links the transaction product to an account or record configured to track a value available for use toward a purchase of one or more of goods and services. Other products, combinations, and associated methods are also disclosed.

16 Claims, 11 Drawing Sheets

U.S. PATENT DOCUMENTS

| | | | |
|---|---|---|---|
| 5,503,434 | A | 4/1996 | Gunn |
| 5,868,429 | A * | 2/1999 | Raymond et al. ............... 283/34 |
| 5,882,763 | A | 3/1999 | Perttunen et al. |
| 5,945,195 | A | 8/1999 | McDonald |
| RE36,395 | E | 11/1999 | McDonald |
| 6,007,895 | A | 12/1999 | McDonald |
| 6,021,941 | A | 2/2000 | Schultz |
| 6,056,323 | A | 5/2000 | McDonald |
| 6,103,332 | A | 8/2000 | McDonald |
| 6,120,228 | A | 9/2000 | Exline |
| D434,653 | S | 12/2000 | Maguire |
| 6,203,017 | B1 * | 3/2001 | Schultz ........................ 273/285 |
| 6,354,985 | B2 * | 3/2002 | Huber ........................... 493/458 |
| 6,398,222 | B1 | 6/2002 | Everett |
| 6,410,114 | B1 | 6/2002 | McDonald |
| 6,572,149 | B2 * | 6/2003 | Long ............................. 283/51 |
| 7,047,677 | B2 | 5/2006 | Rambaldi |
| 7,200,960 | B1 | 4/2007 | Waggoner et al. |
| 7,211,311 | B2 | 5/2007 | McDonald |
| 7,264,155 | B2 | 9/2007 | Halbur et al. |
| 7,314,179 | B1 | 1/2008 | Halbur et al. |
| 7,584,558 | B2 | 9/2009 | Boyd et al. |
| 7,614,548 | B2 | 11/2009 | Schultz et al. |
| 7,717,347 | B2 | 5/2010 | Boyd et al. |
| 7,841,520 | B2 | 11/2010 | Schultz et al. |
| 2002/0143697 | A1 | 10/2002 | Gotfried |
| 2003/0157308 | A1 | 8/2003 | McDonald |
| 2004/0007814 | A1 | 1/2004 | Senart |
| 2004/0051248 | A1 * | 3/2004 | Griesse et al. ................ 273/283 |
| 2004/0188997 | A1 * | 9/2004 | Scrymgeour et al. ......... 283/100 |
| 2004/0251678 | A1 | 12/2004 | Dacey |
| 2005/0023822 | A1 | 2/2005 | McDonald |
| 2005/0040585 | A1 | 2/2005 | McDonald |
| 2005/0194454 | A1 | 9/2005 | Ferber et al. |
| 2006/0099381 | A1 | 5/2006 | McDonald |
| 2007/0016941 | A1 | 1/2007 | Gonzalez et al. |
| 2007/0040036 | A1 | 2/2007 | Hallbauer et al. |
| 2007/0152066 | A1 * | 7/2007 | Colby et al. ................... 235/487 |
| 2007/0252010 | A1 | 11/2007 | Gonzalez et al. |
| 2008/0093425 | A1 | 4/2008 | McDonald |
| 2008/0149727 | A1 | 6/2008 | Boyd et al. |
| 2010/0007087 | A1 * | 1/2010 | Pryke ............................ 273/286 |
| 2010/0069213 | A1 * | 3/2010 | Luciano et al. ............... 493/238 |
| 2011/0057032 | A1 | 3/2011 | Schultz et al. |

OTHER PUBLICATIONS

GiftCard with Rotating Spinner Offered for Sale at Target retail stores at least one year prior to Oct. 31, 2009 (1 page).

Photographs of a gift card on a supporting member as publicly offered for sale in Macy's stores at least as early as Dec. 1, 2007, 1 page.

"GO-Tag™ Solution," firstdata.com, 2008, 2 pages.

GiftCard with Rotating Pinwheel Offered for Sale at Target retail stores beginning Dec. 26, 2004 (2 pages).

* cited by examiner

TRANSACTION PRODUCT WITH FOLDABLE SHEET

BACKGROUND OF THE INVENTION

Stored-value cards and other transaction products come in many forms. A gift card, for example, is a type of transaction product that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction products, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction products provide a number of advantages to both the consumer and the retailer.

SUMMARY OF THE INVENTION

One aspect of the present invention relates to a transaction product including a first cover panel, a second cover panel, and intermediate sheet, and an account identifier. The intermediate sheet is configured to be repeatedly folded and unfolded to transition between a collapsed position and an extended position. In the extended position, the intermediate sheet is substantially planar and sized substantially larger than a combined size of the first cover panel and the second cover panel. The intermediate sheet defines a plurality of fold lines dividing the intermediate sheet into a plurality of sections. When the intermediate sheet is in the collapsed position, the plurality of sections are provided in a stack. The first cover panel is coupled with one of the plurality of sections that forms a top of the stack, and the second cover panel is coupled with another of the plurality of sections that forms a bottom of the stack. The account identifier is coupled with at least one of the first cover panel, the second cover panel, and the intermediate sheet. The account identifier links the transaction product to an account or record configured to track a value available for use toward a purchase of one or more of goods and services. Stored-value product assemblies, methods of providing a transaction product, and other embodiments of stored-value or transaction products and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value product or transaction product, such as a gift card or other financial transaction product, is adapted for making purchases of goods and/or services at, for example, a retail store or web site. According to one embodiment, an original consumer buys a transaction product to give a recipient who in turn is able to use it to pay for goods and/or services. A transaction product, according to embodiments of the present invention, provides means for entertaining and amusing in addition to the ability to pay for goods and/or services.

For example, a transaction product includes two cover panels with a foldable intermediate sheet extending therebetween. When intermediate sheet is folded, the transaction product is provided in a generally rectangular overall form factor where intermediate sheet does not radially extend beyond the edges of the two cover panels, which are positioned opposite one another. The intermediate sheet unfolds such that transaction product takes on a substantially flat and planar configuration. In one embodiment, intermediate sheet is a game board, map, information sheet or other associated member. In one example, other accessory items associated with the game board are included in the transaction product assembly such as game pieces, a spinner, etc. In this manner, transaction product provides amusing functionality in addition to transactional functionality.

Figure 1:
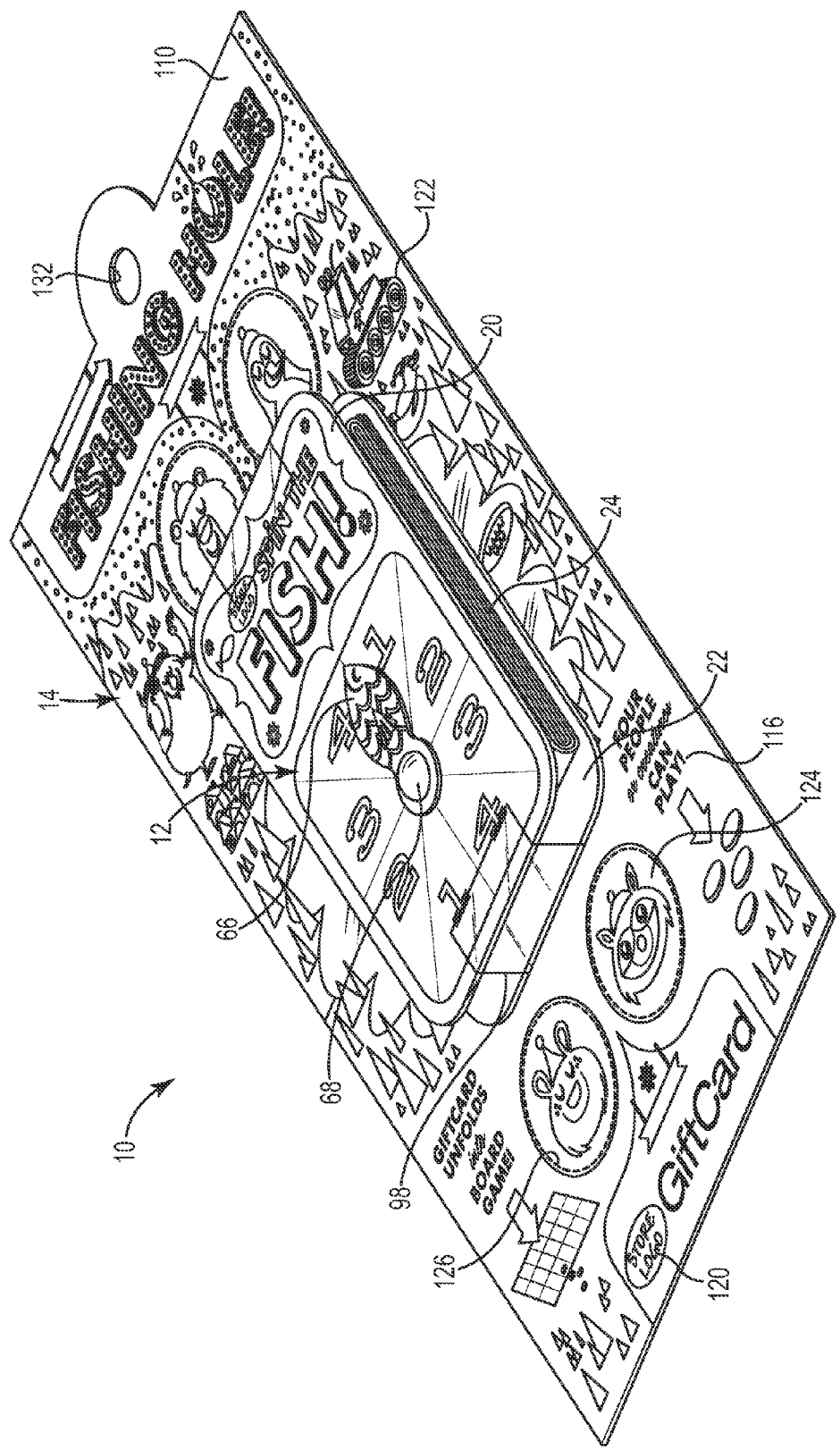
FIG. 1 is a perspective view illustration of a transaction product assembly, according to one embodiment of the present invention.
Figure 2:
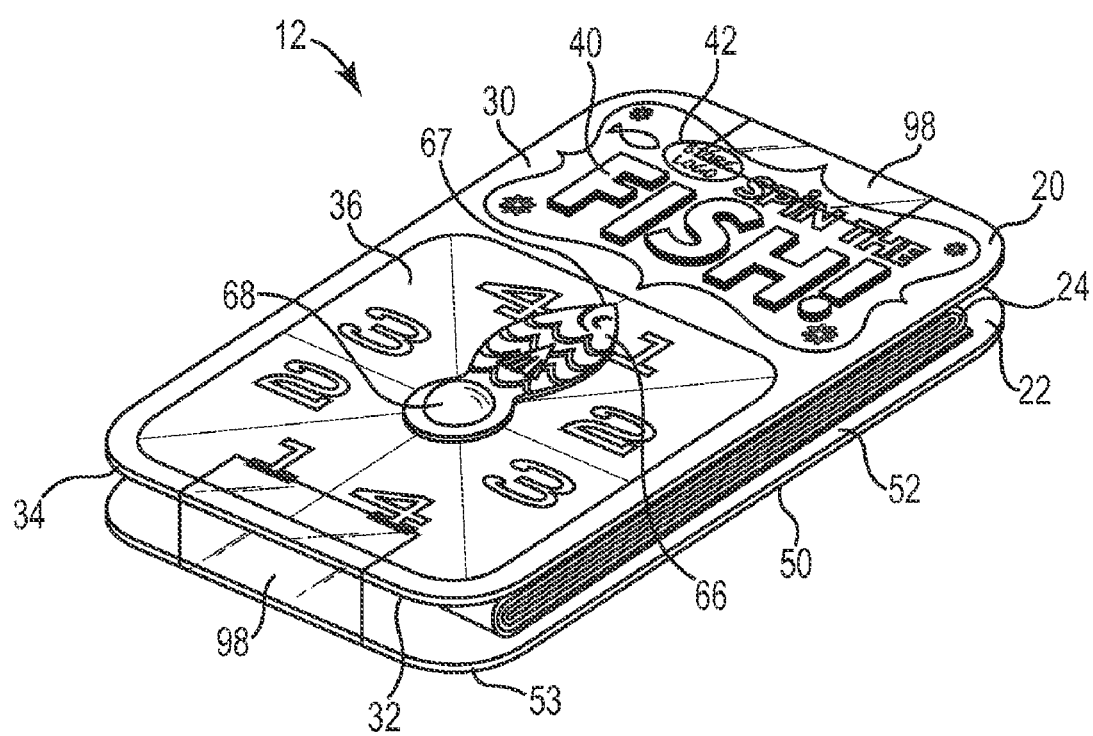
FIG. 2 is a perspective view illustration of a transaction product of the transaction product assembly of FIG. 1, according to one embodiment of the invention
Figure 3:
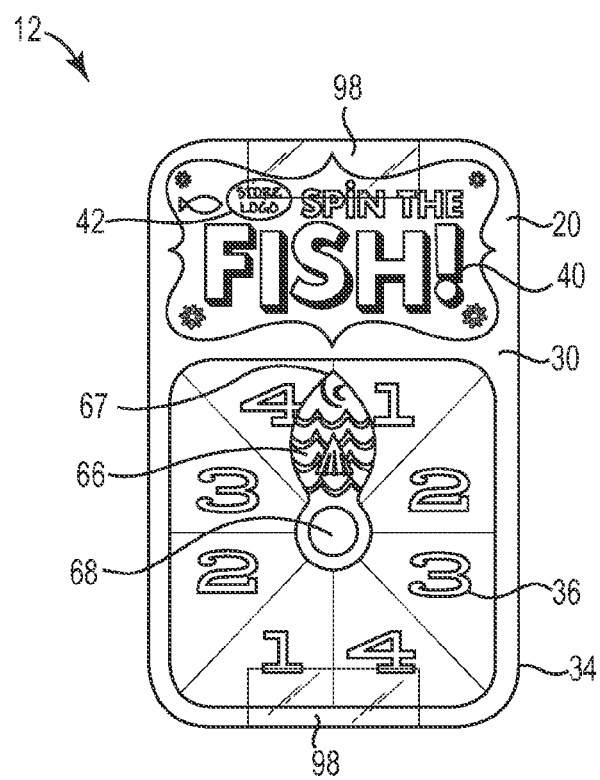
FIG. 3 is a front view illustration of the transaction product of FIG. 2, according to one embodiment of the present invention.
Figure 4:
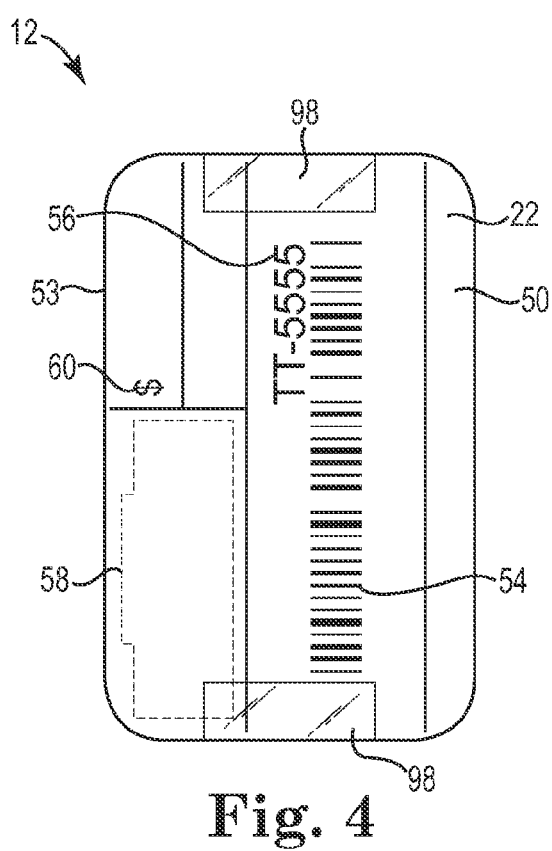
FIG. 4 is a rear view illustration of the transaction product of FIG. 2, according to one embodiment of the present invention.
Figure 5:
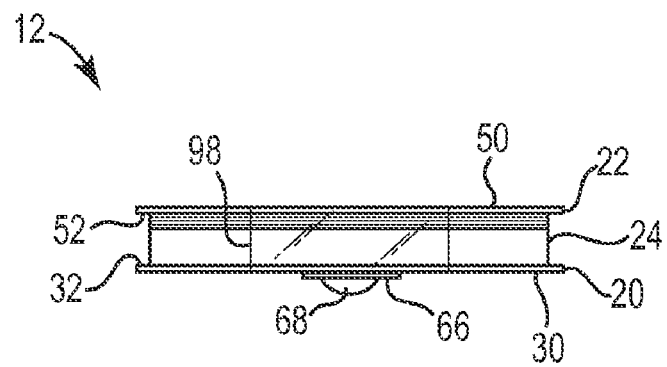
FIG. 5 is a top view illustration of the transaction product of FIG. 2, according to one embodiment of the present invention.
Figure 6:
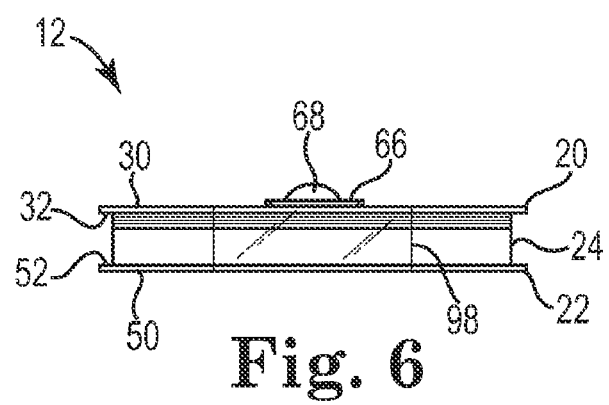
FIG. 6 is a bottom view illustration of the transaction product of FIG. 2, according to one embodiment of the present invention.
Figure 7:
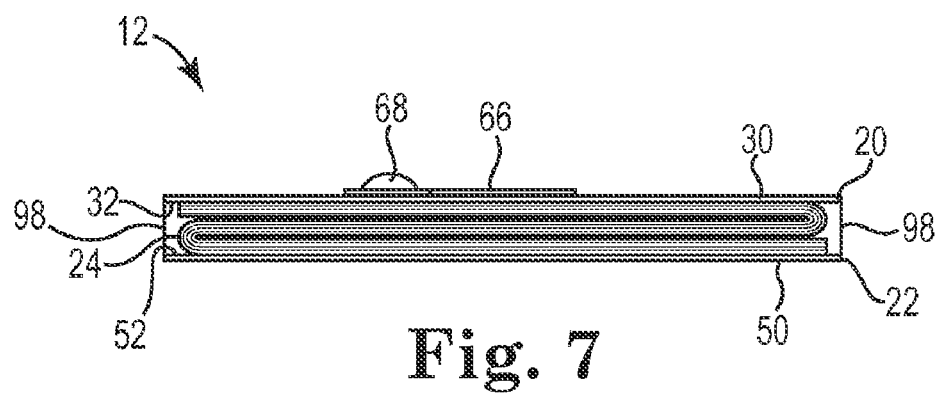
FIG. 7 is a right side view illustration of the transaction product of FIG. 2, the left side view being a mirror image thereof, according to one embodiment of the present invention.
Figure 8:
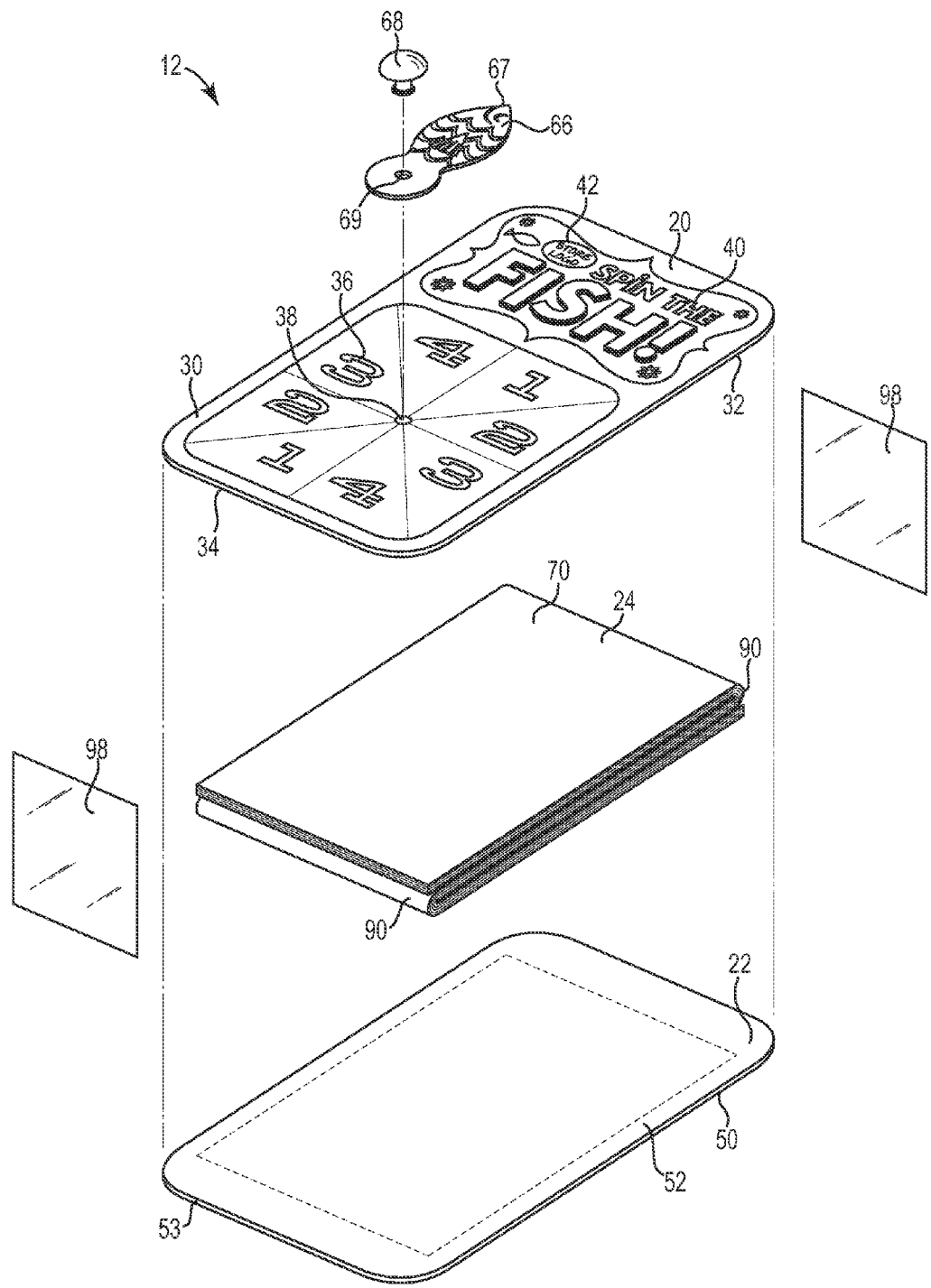
FIG. 8 is an exploded perspective view illustration of the transaction product of FIG. 2, according to one embodiment of the present invention.

Turning to the figures, FIG. 1 illustrates one embodiment of a transaction product assembly 10. The transaction product assembly 10 includes a transaction product 12 (e.g., a stored-value, gift, or calling card or article) and a supporting backer 14. Transaction product 12 is configured to be used toward the purchase and/or use of goods and/or services and additionally provides non-transactional functionality. For example, transaction product additionally provides one or more portions of a game such as a game board and/or a spinner for directing what moves players of the game should take. Backer 14 is configured to support transaction product 12 during retail display and gifting. In one embodiment, backer 14 additionally provides other game accessories such as game pieces, markers, etc. In other embodiments, transaction product 12 provides other non-transactional functionality, e.g., provides a map, directory, child activity items, etc. rather than the amusing game items as will be apparent to those of skill in the art upon reading this application.

FIGS. 2-9 illustrate one embodiment of transaction product 12 including a first cover panel 20 (i.e., top member), a second cover panel 22 (i.e. base member), and an intermediate member or sheet 24. First cover panel 20 comprises a single layer or multiple layers of paper or plastic material, for example, generally in the form of a relatively stiff but bendable/flexible card. Use of other materials is also contemplated. First cover panel 20 defines an outer surface 30 and an inner surface 32 with an outer perimeter 34 generally shared by outer surface 30 and inner surface 32. In one embodiment, one or both of outer surface 30 and inner surface 32 are substantially planar. In one example, outer perimeter 34 is substantially rectangular in shape, however other suitable outer perimeter shapes are equally acceptable.

According to one example, outer surface 30 includes directive fields 36 positioned to extend radially outwardly from and collectively entirely around an aperture 38 defined through first cover panel 20. Each one of directive fields 36 provides instructions to a user regarding how the user should interact with transaction product 12 when using transaction product 12 for non-transactional purposes. For example, where intermediate sheet 24 provides a game board, each of directive fields 36 indicates whether the user should move her game piece and how far the user should move her game piece if the corresponding directive field 36 is selected as will be further described below.

In one embodiment, outer surface 30 includes additional indicia such as decorative indicia 40 and brand indicia 42. In one example, decorative indicia 40 relate to a particular occasion, such as a wedding, new baby, graduation, holiday, season, brand identifier, media format identifier or other visual design to promote purchase of transaction product 12. In one example, decorative indicia 40 relate to content on intermediate sheet 24 and/or may at least partially summarize or promote the content on intermediate sheet 24. Brand indicia 42 identify a brand associated with transaction product 12 such as identifying a product brand, a store brand, department, etc. In one example, brand indicia 42 identify a store or location configured to accept transaction product as payment toward a purchase of goods and/or services.

Second cover panel 22 comprises a single layer or multiple layers of paper or plastic material, for example, generally in the form of a relatively stiff but bendable/flexible card. Use of other materials is also contemplated. Second cover panel 22 defines an outer surface 50 and an inner surface 52 with an outer perimeter 54 generally shared by outer surface 50 and inner surface 52. In one embodiment, one or both of outer surface 50 and inner surface 52 are substantially planar. In one example, outer perimeter 54 is substantially rectangular in shape; however, other suitable outer perimeter shapes are equally acceptable. As illustrated, in one embodiment, first cover panel 20 and second cover panel 22 are formed of a similar material and have similarly sized and shaped outer perimeters 34 and 54.

In one embodiment, outer surface 50 includes various indicia, demarcations, or other features. In one example, outer surface 50 includes an account identifier 44 (e.g., FIG. 4) such as a barcode, magnetic strip, a smart chip or other electronic device, a radio frequency identification (RFID) device or other suitable identifier readily machine readable by a point-of-sale terminal or other account access station or kiosk. Account identifier 44 indicates an account or record to which transaction product 12 is linked. The account or record of the monetary or other balance on transaction product 12 optionally is maintained on a database, other electronic or manual record-keeping system or, in the case of "smart" cards for example, on a chip or other electronics or devices on transaction product 12 itself. Accordingly, by scanning account identifier 44, the account or record linked to transaction product 12 is identified and can subsequently be activated, have amounts debited therefrom and/or have amounts added thereto.

In one embodiment, account identifier 44 includes a character string or code 46 (e.g., a number and or letter string) configured to provide additional security to the use of transaction product 12 and/or configured to be read by a bearer of transaction product 12 to facilitate use of transaction product 12 for web site or other purchases outside of a brick-and-mortar type retail establishment. With the above in mind, account identifier 44 is one example of means for linking transaction product 12 with an account or record, and scanning of account identifier 44 is one example of means for activating or loading value on transaction product 12. In one embodiment, account identifier 44 is located on a portion of transaction product 12 other than outer surface 50 of second cover panel 22, for example, on first cover panel 20 or intermediate sheet 24.

In one embodiment, redemption indicia 58 are included on transaction product 12, for example, on outside surface 50 of second cover panel 22. Redemption indicia 58 indicate that transaction product 12 is redeemable for the purchase of goods and/or services and that, upon use, a value of the purchased goods and/or services will be deducted from the financial account or record linked to transaction product 12. In one embodiment, redemption indicia 58 include phrases such as "<NAME OF STORE> GiftCard" and "This GiftCard is redeemable for merchandise or services at any of our stores or at our web site," and/or provides help or phone line information in case of a lost, stolen or damaged stored-value card, etc.

In one embodiment, outer surface 50 of second cover panel 22 or any other suitable portion of first cover panel 20 and second cover panel 22 includes an amount field or other personalization field configured to be written to by a consumer and/or retail store employee. In one embodiment, amount field 60 is positioned and configured to provide an area for the consumer or retail employee to write an amount or value added to transaction product 12 on initial activation. It should be understood that other indicia may be included on first cover panel 20 and second cover panel 22, for example, instructional indicia, promotional indicia, additional decorative indicia, etc.

In one embodiment, transaction product 12 includes a spinner 66 or other auxiliary member and a rivet or other suitable connection device 68. In one example, spinner 66 is formed as a relatively planar member with an elongated form including an aperture 69 near a first end and a point 67 or narrowed portion of spinner 66 near an opposite end of spinner 66.

Spinner 66 is placed on outer surface 30 of first cover panel 20 so aperture 69 of spinner 66 aligns with aperture 38 of first cover panel 20. Connection device 68 extends through aperture 69 of spinner 66 and aperture 38 of cover panel 20 to couple spinner 66 to cover panel 20. In one embodiment, aperture 69 of spinner 66 is larger in diameter than at least a primary shaft of connection device 68 such that upon coupling, spinner 66 is free to spin or rotate about connection device 68.

Intermediate sheet 24 is a substantially planar member made of one or more layers of any suitable paper, plastic, microfiber fabric, or composite material configured to be readily folded and unfolded a plurality of times without easily tearing or otherwise being substantially damaged. In one embodiment, intermediate sheet 24 is made out a material similar to that commonly used for foldable maps, etc. In one embodiment, intermediate sheet 24 is laminated to increase durability.

Intermediate sheet 24 defines a front surface 70 and a rear surface (not shown) opposite the front surface and is divided into a plurality of sections 92, which, in one example, are all substantially similar in size, by a plurality of fold lines 90. In one example, fold lines 90 include lateral fold lines 90a and longitudinal fold lines 90b. When unfolded, intermediate sheet 24 is many times larger than either of first cover panel 20 and second cover panel 22 and, in one example, is at least about four times larger, for example, about twenty-four times larger than one of the plurality of sections 92. When fully folded about all fold lines 90, intermediate sheet 24 is configured to be the size (laterally and longitudinally) of one of the plurality of sections 92, but with an increased thickness. In one embodiment, each of the plurality of sections 92 is sized smaller than either first cover panel 20 and second cover panel 22.

In one embodiment, front surface 70 is configured to provide a game board 74 configured for user interaction. More particularly, in one example, front surface 70 defines a game path 76 divided into a plurality of spaces 78 along the length of game path 76. Game path 76 extends from a start 80 to a finish 82, which are each configured to be easily identifiable due to indicia, demarcations, or other features emphasizing the position of start 80 and finish 82 on front surface 70. In one embodiment, other decorative indicia 84 are included to set the scene and/or establish a theme for game board 74. For example, in the illustrated embodiment, game board 74 is in the theme of wildlife characters, winter fishing, and other winter and/or aquatic-related activities.

In one example, front surface 70 includes brand indicia 86, which identify a brand associated with transaction product 12 such as identifying a product brand, a store brand, department, etc. In one example, brand indicia 42 identify a store or location configured to accept transaction product 12 as payment toward a purchase of goods and/or services. By incorporating brand indicia 86, transaction product 12 serves as a continuous reminder and advertisement for the brand, store, department, etc. associated with transaction product 12 while the consumer interacts with transaction product for non-transactional purposes.

Figure 9:
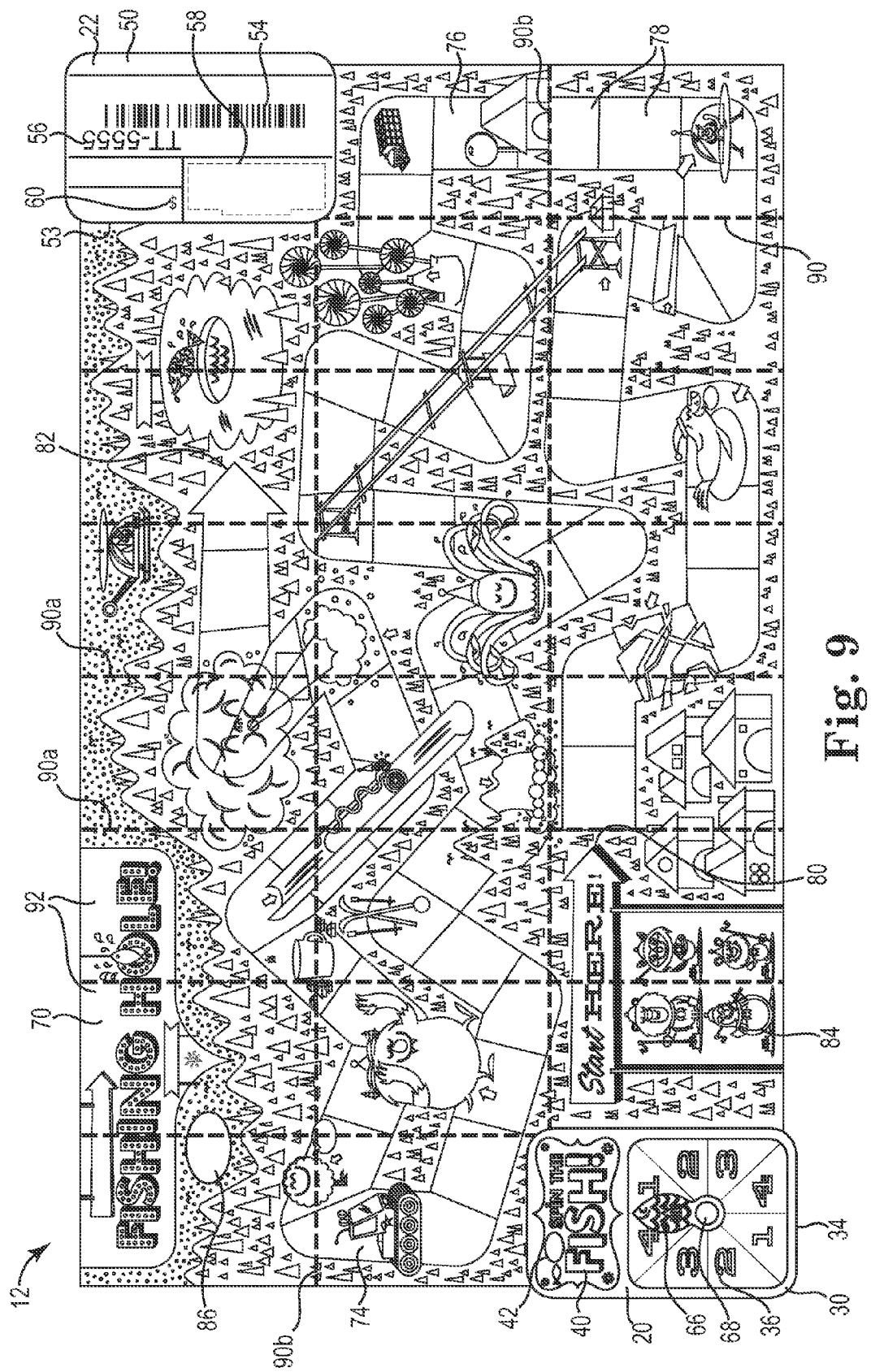
FIG. 9 is a front view illustration of the transaction product of FIG. 2 in an expanded configuration, according to one embodiment of the present invention.

First cover panel 20 and second cover panel 22 are coupled with intermediate sheet 24 at opposite corners thereof, for example, using adhesive. As illustrated in FIG. 9, in one embodiment, inner surface 32 of first cover panel 20 is securely coupled to a portion of front surface 70 defined by a corner one of the plurality of sections 92 of intermediate sheet 24, for example, the lower left corner of intermediate sheet 24. Inner surface 52 of second cover panel 20 is securely coupled to a portion of front surface 70 defined by an opposite corner one of the plurality of sections 92 of intermediate sheet 24, for example, the upper right corner of intermediate sheet 24. In this embodiment, an even number of longitudinal fold lines 90b (e.g., two in the illustrated embodiment of FIG. 9) are provided such that an odd number of sections 92 (e.g., three) are laterally formed along a width (i.e., the direction up and down in FIG. 9) of intermediate sheet 24. In one embodiment, an odd number of lateral fold lines 90a (e.g., seven in per the illustrated embodiment of FIG. 9) are provided such that an even number of sections 92 are longitudinally formed along a length (i.e., the direction side to side in FIG. 9) of intermediate sheet 24. In one example, each of the respective corner ones of the plurality of sections 92 is centered relative to the respective first cover panel 20 and the second cover panel 22 as generally illustrated in dashed lines in FIG. 8.

Once first cover panel 20 and second cover panel 22 are secured to intermediate sheet 24, intermediate sheet 24 is folded along fold lines 90. In particular, intermediate sheet 24 is first folded in an accordion fashion (i.e., in alternating directions about adjacent fold lines) about lateral fold lines 90a to form an elongated member having a width equal to a width of one section 92 and a length equal to that of three sections 92. In this format, first cover panel 20 and second cover panel 22 face in opposite directions (i.e., one forward and one rearward).

Next, intermediate sheet 24 is folded along longitudinal fold lines 90b. More specifically, intermediate sheet 24 is folded along the one of longitudinal fold lines 90b adjacent first cover panel 20 such that first cover panel 20 faces in the same direction as second cover panel 22 and so that the resulting partially folded intermediate sheet 24 is the same height as two sections 92. In one embodiment, intermediate sheet 24 is then folded along the one of longitudinal fold lines 90b adjacent second cover panel 22 such that second cover panel 22 faces in an opposite direction as first cover panel 20, for example, as illustrated in FIGS. 2-7, in the final folded or collapsed configuration of transaction product 12.

In the final folded configuration, the overall width and length of folded intermediate sheet 24 is less than each of a width and a length of first cover panel 20 and second cover panel 22. As a result, intermediate sheet 24 is substantially hidden from view when transaction product 12 is viewed from either a front perspective (e.g., FIG. 3) or a rear perspective (e.g., FIG. 4). In one embodiment, tape, stickers, or other adhesive member(s) 98 each are applied to outer surface 30 of first cover panel 20, extend around a side edge of transaction product 12, and are applied to outer surface 50 of second cover panel 22 to maintain transaction product 12 in the fully folded or collapsed position until a consumer desires to unfold transaction product 12.

In one embodiment, first cover panel 20 and second cover panel 22 provide relatively rigid top and bottom cover for the intermediate sheet 24. In one embodiment, the additional rigidity and the larger size of first cover panel 20 and second cover panel 22 as compared to the size of the stack formed by the folded intermediate sheet 24 substantially protect intermediate sheet 24 from damage such as bent corners, rips, etc.

Upon assembly, transaction product 12 functions to both amuse consumers and/or recipients and to entice consumers to purchase transaction product 12. In particular, consumers are encouraged to purchase transaction product 12 due to its added entertainment value. In particular, in one embodiment, transaction product 12 provides a fully functional game in addition to the stored-value or similar transactional features of transaction product 12. For instance, intermediate sheet 24 provides a game board 74 and first cover panel 20 includes a spinner 66 with directive fields 36 for use to instruct a user how to interact with game board 74. In the illustrated embodiments, game board 74 provides a path 76 with spaces 78 collectively defining the path 76 between start 80 and finish 82. Directional fields 36 include numbers, for example, between one and four.

When a user flicks or otherwise moves spinner 66 to induce rotation of spinner 66 about connection device 68, spinner 66 rotates about connection device 68 until the induced energy is dissipated and spinner 66 rests on one of directive fields 36. In response, a user moves her game piece 124 (further described below) a number of consecutive spaces 78 on path 76 equal to the number on the corresponding directional field 36. Where multiple users interact with game board 74, the multiple users take turns rotating spinner 66, moving their game piece 124 the appropriate number of spaces 78 along path 76 and performing any action(s) described on the space 78 where the user's game piece 124 lands following such movements, etc. until one user reaches finish 82 before the others and is declared the winner. Other various game boards, etc. may be implemented using intermediate sheet 24 as will be apparent to those of skill in the art upon reading the present application. For example, intermediate sheet 24 may provide a map, chart(s), or any other suitable items well suited for use in a substantially planar state and for compact storage during periods of non-use.

Figure 11:
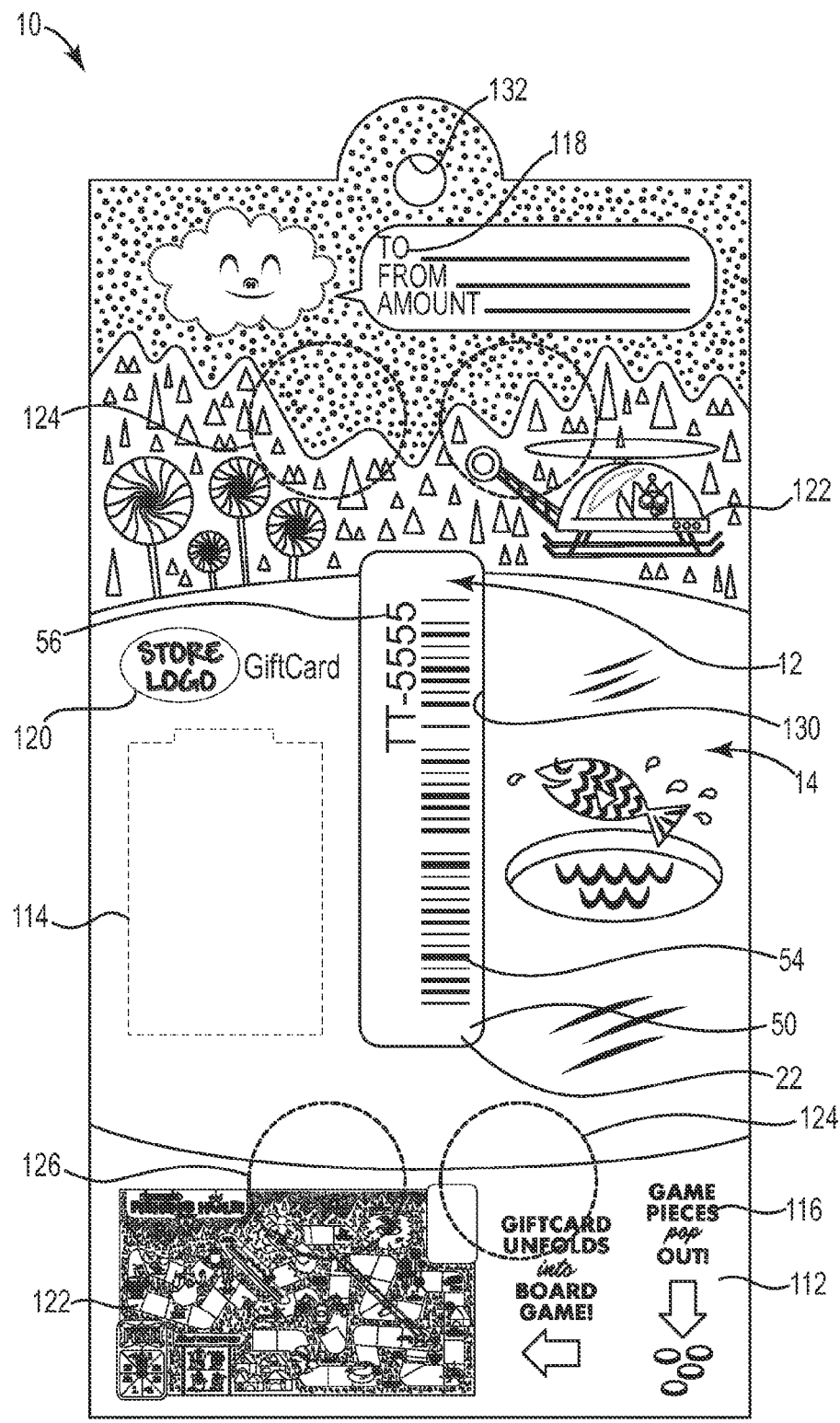
FIG. 11 is a rear view illustration of the transaction product assembly of FIG. 1, according to one embodiment of the present invention.
Figure 12:
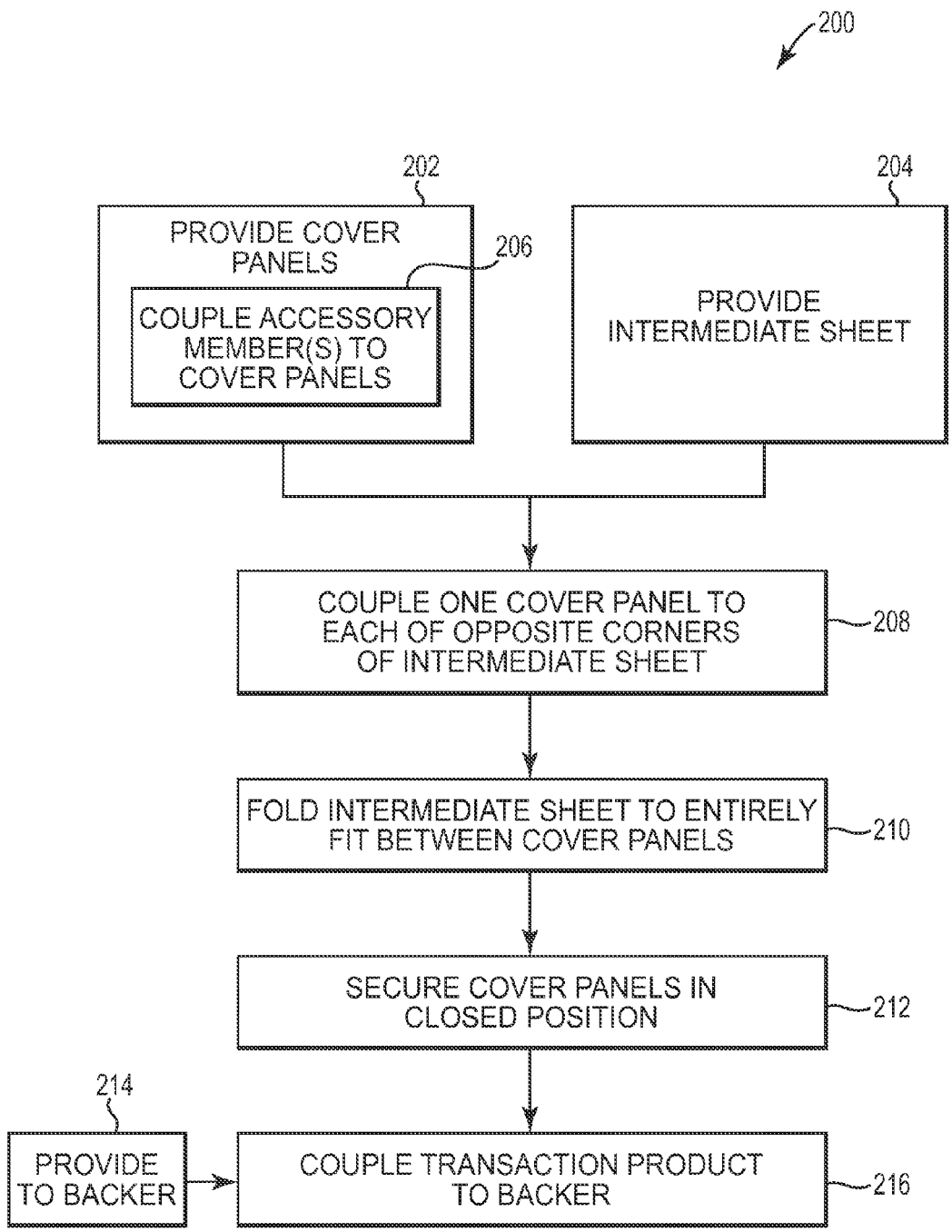
FIG. 12 is a flow chart illustrating a method of assembling a transaction product assembly, according to one embodiment of the present invention.

FIGS. 11 and 12 illustrate a carrier or backer 14 supporting transaction product 12 (FIGS. 1-6). Backer 14 comprises a single layer or multiple layers of paper or plastic material, for example, generally in the form of a relatively stiff but bendable/flexible card. Use of other materials is also contemplated. As such, backer 14 defines a first or front surface 110 (FIG. 11) and a second or rear surface 112 (FIG. 12). Transaction product 12, which is generally represented in phantom lines in FIG. 11 for illustrative purposes (e.g., to allow for full viewing of front surface 110), is readily releasably attached to backer 14, for example, by adhesive, blister packaging, overlying skinning material or the like, such that transaction product 12 with backer 14 collectively define a transaction product assembly 10.

Backer 14 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 110 and 112. In one example, the indicia include one or more of redemption indicia 114, instructional indicia 116, message field indicia 118, brand indicia 120, decorative indicia 122, etc.

Redemption indicia 114 indicate that transaction product 12 is redeemable for the purchase of goods and/or services and that upon use, a value of the purchased goods and/or services will be deducted from the financial account or record linked to transaction product 12. In one embodiment, redemption indicia 114 include phrases such as "<NAME OF STORE> GiftCard" and "This GiftCard is redeemable for merchandise or services at any of our stores or at our website," and/or provides help or phone line information in case of a lost, stolen or damaged transaction product 12, etc.

Instructional indicia 116 include any indicia generally referring to how transaction product 12 can be used for purposes other than value redemption. For example, indicia 116 may instruct the bearer that a game board 74 is included with transaction product 12 and may provide examples or instruction for such interaction. Other instructional indicia 116 are also contemplated.

Message field indicia 118 for example include "to," "from" and "amount" fields are configured to be written to by the bearer of transaction product assembly 10 prior to presenting transaction product assembly 10 to a recipient. As such, message field indicia 118 facilitate the consumer in preparing transaction product assembly 10 for gifting to a recipient.

Brand indicia 120 identify a store, brand, department, etc. and/or services associated with transaction product 12. Any decorative indicia 122, which may be similar to or coordinate with indicia of transaction product 12, may also be included on backer 14. Any of indicia 114, 116, 118, 120, 122 or other indicia optionally may appear anywhere on backer 14 or transaction product 12. Additional information besides that specifically described and illustrated herein may also be included.

In one example, backer 14 forms additional items such as auxiliary or accessory items configured for use with intermediate sheet 24. For instance, where intermediate sheet 24 provides a game board 74, backer 14 includes accessory items in the form of game tokens or pieces 124. In one example, a perforation 126 is formed as a closed shape to define one game piece therein such that game piece 124 can relatively easily be removed from a remainder of backer 14 without using tools. In one embodiment, backer 14 forms multiple game pieces 124 and/or other accessory items to be used when interacting with intermediate sheet 24 and the content and/or activities defined thereon.

In one embodiment, backer 14 includes a window or opening 130 for displaying account identifier 44 of transaction product 12 as illustrated in FIG. 12. As previously described, account identifier 44 is adapted for accessing an account or record associated with transaction product 12 for activating, loading or debiting value from the account or record. Accordingly, in one embodiment, opening 130 allows access to account identifier 44 to activate and/or load transaction product 12 without removing transaction product 12 from backer 14.

In one embodiment, backer 14 defines a hanging aperture 132 configured to receive a support arm or hook, such that transaction product assembly 10 can be hung from a rail or rack within the retail setting or elsewhere to facilitate display of transaction product assembly 10. According to one embodiment, FIG. 12 illustrates surfaces of backer 14 that will be supported on a rack or other fixture while FIG. 11 illustrates surfaces of backer 14 that will be visible to a consumer of a retail store who is considering the purchase of transaction product assembly 10. Other backers, such as foldable backers (not shown), can be used with various sizes and shapes of transaction products 12.

FIG. 12 is a flow chart illustrating one embodiment of a method 200 of assembling transaction product 12. At 202, first cover panel 20 and second cover panel 22 are provided. In one embodiment, providing first cover panel 20 at 202 includes coupling spinner 66 or other accessory members thereto. For example, aperture 69 of spinner 66 is aligned with aperture 38 of first cover panel 20 and connection device 68 (e.g., a plastic or metal rivet) is placed therethrough to couple spinner 66 to first cover panel 20. In one example, aperture 38 is larger than the main shaft of connection device 68, but not a head of connection device 68 such that spinner 66 is able to freely rotate around connection device 68, but remains coupled to first cover panel 20 between first cover panel 20 and the head of connection device 68. At 204, intermediate sheet 24 is provided in a form similar to that described above.

At 208, one of first cover panel 20 and second cover panel 22 is coupled to each of opposite corners of intermediate sheet 24, more specifically, to each of opposite corner ones of the plurality of sections 92. In one embodiment, first cover panel 20 and second cover panel 22 are each coupled to portions of front surface 70 of intermediate sheet 24 such that the corresponding corner section 92 is centered relative to the respective one of first cover panel 20 and second cover panel 22. Then, at 210, intermediate panel 24 is folded about fold lines 90 into a folded stack of sections 92, and first cover panel 20 and second cover panel 22 are secured to one another to remain in a folded or compacted position. For example, transparent or translucent stickers 98 are applied to and extend between first cover panel 20 and second cover panel 22 to prevent inadvertent unfolding or expansion of transaction product 12, more particularly, intermediate sheet 24. Although described above as folding intermediate sheet 24 after first cover panel 20 and second cover panel 22 have been attached thereto, in one embodiment, first cover panel 20 and second cover panel 22 are coupled to opposing corner ones of the plurality of sections 92 of intermediate sheet 24 when intermediate sheet 24 is folded. This alternate timing for coupling first cover panel 20 and second cover panel 22 to intermediate sheet 24 is facilitated by the fact that, in one embodiment, the opposite corner ones of the plurality of sections 92 are positioned at the bottom and top of the folded stack of the plurality of sections 92 when intermediate sheet 24 is fully folded (e.g., FIG. 8). In particular, portions of front surface 70 defined by the opposite corner ones of the plurality of sections 92 face outwardly away from a remainder of intermediate sheet 24 when intermediate sheet 24. When transaction product 12 is assembled, outer surfaces 30 and 32 of first cover panel 20 and second cover panel 22, respectively, face outwardly away from one another and a remainder of transaction product 12.

Backer 14 is provided at 214. In one embodiment, providing backer 14 includes providing one example of means for supporting transaction product 12 and providing game pieces 124 or other accessory items formed integrally therewith. Then, at 216, collapsed (i.e., folded) transaction product 12 is coupled with backer 14 to form transaction product assembly 10. In particular, outer surface 50 of second cover panel 22 is coupled to backer 14 with releasably adhesive such that account identifier 54 on outer surface 50 is aligned with and viewable through opening 130. In this arrangement, account identifier 44 of transaction product 12 is accessible for scanning while transaction product 12 is coupled with backer 14.

Other suitable methods of coupling backer 14 with transaction product 12 may additionally or alternatively be used such as use of an overlying transparent or translucent skinning material, coupling members, etc. as will be apparent to those of skill in the art upon reading the present applications. In one embodiment, where a coupling method is used that does not cover spinner 66, transaction product assembly 10 is provided for retail display in a manner allowing potential consumers to interact with spinner 66 before buying transaction product 12, which amuses the potential consumer and encourages the potential consumer to buy transaction product 12.

Figure 10:
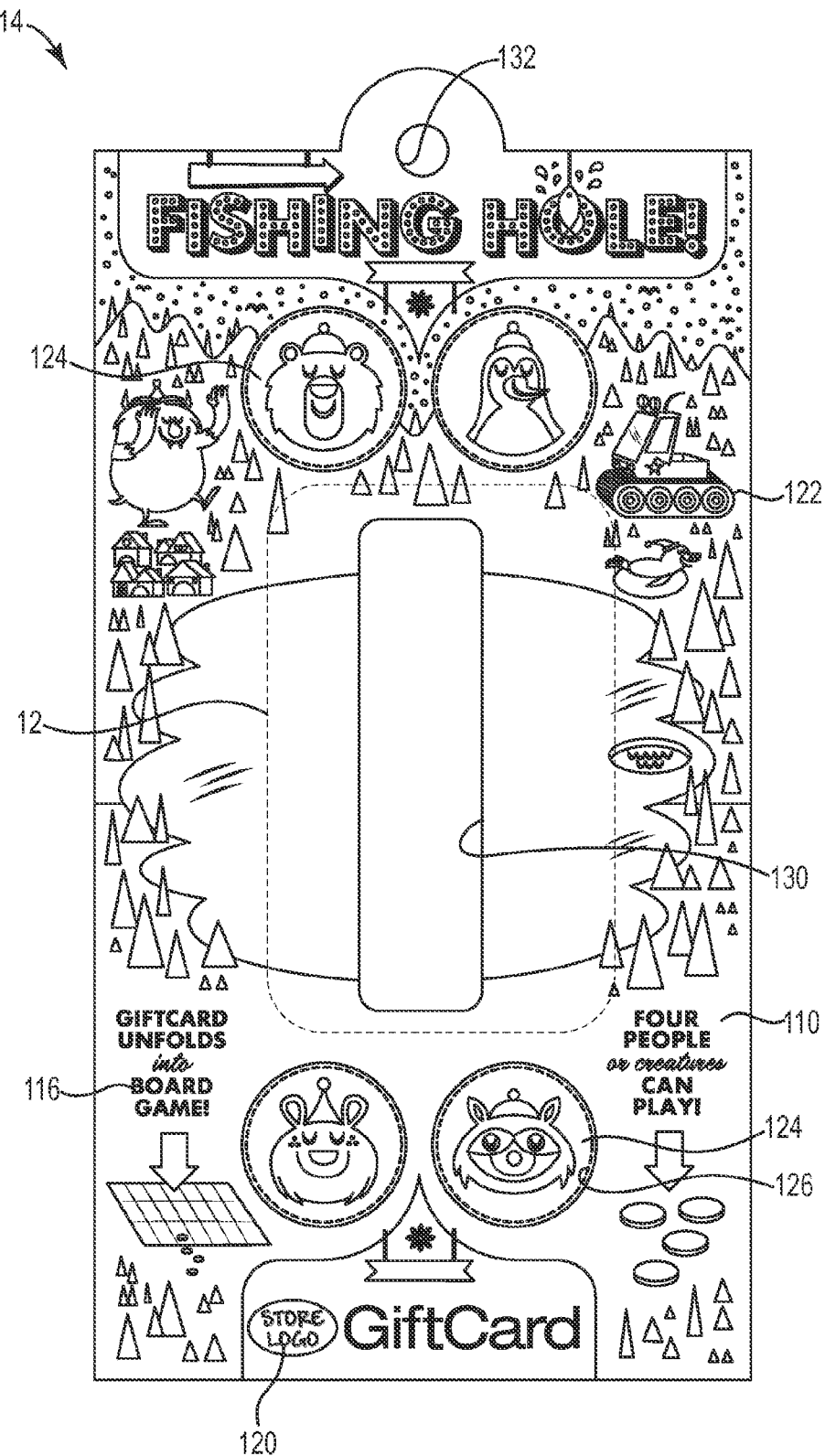
FIG. 10 is a front view illustration of a backer of the transaction product assembly of FIG. 1, according to one embodiment of the present invention.
Figure 13:
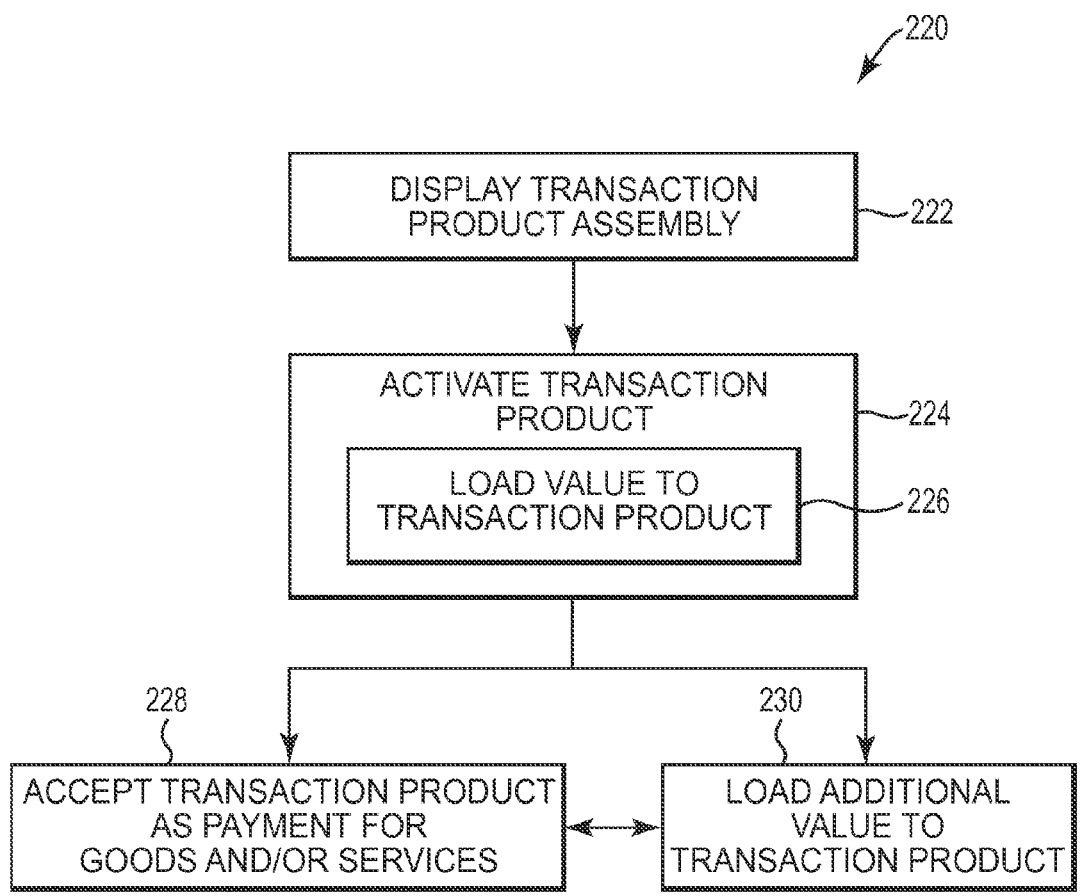
FIG. 13 is a flow chart illustrating a method of encouraging purchase and facilitating use of a transaction product assembly, according to one embodiment of the present invention.

FIG. 13 is a flow chart illustrating one embodiment of a method 220 of encouraging purchase and facilitating use of transaction product 12 by consumers and/or recipients. At 222, transaction product 12 is placed on or hung from a rack, shelf or other similar device to display transaction product 12 for sale to potential consumers. For example, additionally referring to FIGS. 1, 10, and 11, backer 14 may be hung from a display rack using aperture 132 such that transaction product 12 is readily visible to potential consumers. In one embodiment, a depiction of transaction product 12 is placed on a web site for viewing by potential consumers. In one embodiment, decorative indicia 122 includes a miniature depiction of front surface 70 of intermediate sheet 24 so that potential consumers can see what they are receiving when they are purchasing without expanding transaction product 12.

At 224, a consumer who has decided to purchase transaction product 12 presents transaction product 12 on backer 14 to a retail store employee, retail store kiosk, remote terminal or other person or device to scan account identifier 44 using a machine, such as a kiosk or point-of-sale terminal, to access an account or record linked to account identifier 44. In particular, account identifier 44 is scanned or otherwise accessed, for example through opening 130 of backer 14 to activate transaction product 12. Upon accessing the account or record, then, at 226, value is added to the account or record in the form of monetary value, points, minutes, etc. Thus, transaction product 12 is activated and loaded.

In one example, a predetermined value is associated with transaction product 12 (i.e., associated with the account or record linked to transaction product 12 via account identifier 44) prior to activation and display, but such predetermined value is not initially available for use toward the purchase or use of goods and/or services. In such an embodiment, at 224, transaction product 12 is activated to permit subsequent access to the predetermined value (e.g., subsequent loading on and debiting from the account or record) and no additional value is added during activation such that operation 336 may be eliminated.

Once transaction product 12 is activated and loaded, transaction product 12 can be used by the consumer or any other bearer of transaction product 12 to purchase goods and/or services at the affiliated retail setting (e.g., a retail store or web site) or can be used in exchange for calling minutes, etc. In one embodiment, where transaction product 12 is displayed on a web site at 222, then, at 224, transaction product 12 may be activated in any suitable method and may not require the physical scanning of account identifier 44 to be activated or to otherwise access the associated account or record such as at 226.

In one example, at 228, the retail store or other affiliated retail setting or web site accepts transaction product 12 as payment toward the purchase of goods and/or services made by the current bearer of transaction product 12. In particular, the value currently loaded on transaction product 12 (i.e., stored or recorded in the account or record linked to account identifier 44) is applied toward the purchase of goods and/or services. At 230, additional value is optionally loaded on transaction product 12 at a point-of-sale terminal, kiosk or other area of the retail store, retail web site, or other related setting. Upon accepting transaction product 12 as payment at 228, the retail store or related setting can subsequently perform either operation 228 again or operation 230 as requested by a current bearer of transaction product 12. Similarly, upon loading additional value on transaction product 12 at 230, the retail store or related setting can subsequently perform either operation 230 again or operation 228. In one example, the ability to accept transaction product 12 as payment for goods and/or services is limited by whether the account or record associated with transaction product 12 has any value stored or recorded therein at the time of attempted redemption.

Figure 14:
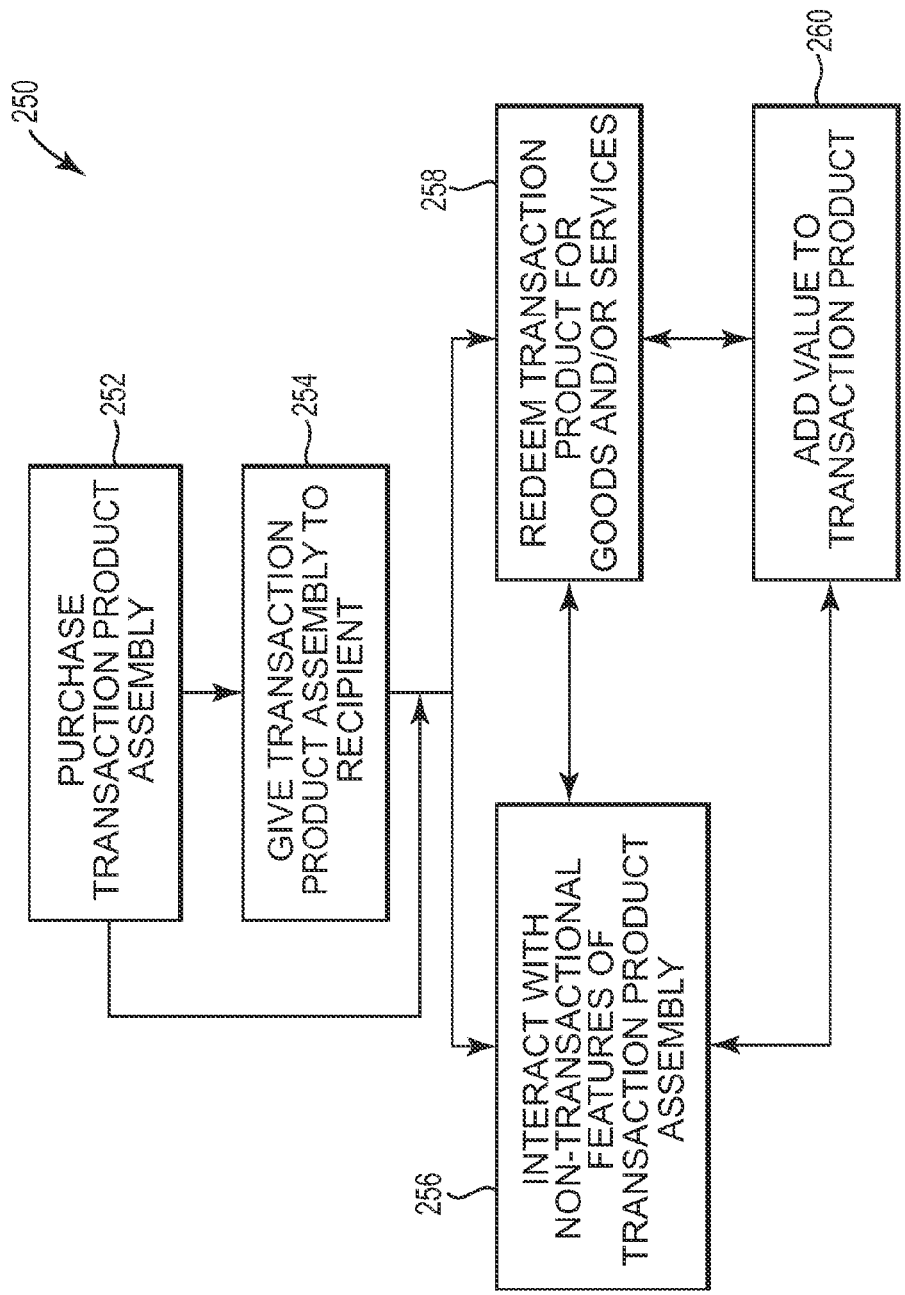
FIG. 14 is a flow chart illustrating a method of using a transaction product assembly, according to one embodiment of the present invention.

FIG. 14 is a flow chart illustrating one embodiment of a method 250 of using transaction product 12 (e.g., FIGS. 1-9). At 252, a potential consumer of transaction product 12, which is displayed in a retail store or viewed on a web site, decides to and does purchase transaction product 12 from the retail store or web site. It should be understood that transaction product 12 can be displayed and purchased alone or as part of transaction product assembly 10 (FIG. 1) along with backer 14. Upon purchasing transaction product 12, a retail store employee, a retail store kiosk or other person or device scans account identifier 44 (FIGS. 4 and 11) through opening 130 of backer 14 or otherwise reads or accesses account identifier 44. Upon accessing account identifier 44, the account or record linked to account identifier 44 is accessed and activated to load value onto transaction product 12 (i.e., load value to the account or record associated with transaction product 12). In one embodiment, such as where transaction product 12 is purchased at 252 via a web site, actual scanning or other mechanical detection of account identifier 44 may be eliminated and/or manual input of code 46 may be added.

At 254, the consumer optionally gives transaction product 12 to a recipient, such as a graduate, relative, friend, expectant parents, one having a recent or impending birthday, a couple having a recent or impending anniversary, etc. In one embodiment, a plurality of transaction product assemblies 10 are purchased and given to party goers, such as at a birthday party, etc. as party favors or gifts. As an alternative, the consumer can keep transaction product 12 for his or her own use thereby eliminating operation 254.

At 256, the consumer, recipient or other current bearer of transaction product 12 interacts with transaction product 12. In one embodiment, playing or otherwise interacting with transaction product 12 at 256 includes removing transaction product 12 from backer 14, removing stickers 98 from transaction product 12, unfolding intermediate sheet 24, removing game pieces 124 from a remainder of backer 14, placing game pieces 124 on path 76 of intermediate sheet 24, advancing game pieces 124 based on interaction with spinner 66, and/or any other suitable interaction with the non-transactional features of transaction product 12.

At 258, the consumer or recipient redeems transaction product 12 for goods and/or services from the retail store or web site. At 260, the consumer or recipient of transaction product 12 optionally adds value to transaction product 12, more particularly, to the account or record associated with account identifier 44 included therewith, at the retail store or over the Internet (i.e., via the web site). Upon playing with transaction product 12 at 256, redeeming transaction product 12 at 258, or adding value to transaction product 12 at 260, the consumer or recipient of transaction product 12 subsequently can perform either of operations 256, 258, or 260 as desired. In one embodiment, the ability of the consumer or recipient to repeat redeeming transaction product 12 at 258 is limited by whether the account or record linked with transaction product 12 has any remaining value stored or recorded therein at the time of attempted redemption.

Although primarily described above as occurring at a single retail store or web site, in one embodiment, purchasing transaction product 12 at 252, redeeming transaction product 12 at 258, and adding value to transaction product 12 at 260, can each be performed at any one of a number of stores adapted to accept transaction product 12 or over the Internet. In one example, a number of stores are each part of a chain or are similarly branded stores. In one example, a number of stores include at least one web site and/or at least one conventional brick and mortar store.

Transaction cards and other products come in many forms, according to embodiments of the invention. The gift card, like other transaction products, can be "re-charged" or "reloaded" at the direction of the original consumer, the gift recipient or a third party. The term "loading on" or "loaded on" herein should be interpreted to include adding to the balance of an account or record associated with a transaction card. The balance associated with the transaction card declines as the transaction card is used, encouraging repeat visits or use. The transaction card remains in the user's purse or wallet, serving as an advertisement or a reminder to revisit the associated merchant. Gift cards according to embodiments of the invention provide a number of advantages to both the consumer and the merchant. Other gift cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction product comprising:
   a first cover panel;
   a second cover panel;
   an intermediate sheet configured to be repeatedly folded and unfolded to transition between a collapsed position and an extended position, wherein:
     in the extended position, the intermediate sheet is substantially planar and sized substantially larger than a combined size of the first cover panel and the second cover panel;
     the intermediate sheet defines a plurality of longitudinally- and laterally-extending fold lines dividing the intermediate sheet into a plurality of sections,
     when the longitudinally- and laterally-extending fold lines are folded such that the intermediate sheet is in the collapsed position, the plurality of sections are provided in a stack,
     the first cover panel is coupled with one of the plurality of sections that forms a top of the stack, and
     the second cover panel is coupled with another of the plurality of sections that forms a bottom of the stack;
   an account identifier coupled with at least one of the first cover panel, the second cover panel, and the intermediate sheet, the account identifier linking the transaction product to an account or record configured to track a value available for use toward a purchase of one or more of goods and services; and
   an auxiliary member movably coupled with the first cover panel opposite the intermediate sheet;
   wherein the first cover panel includes directive fields circumferentially spaced from one another, and the auxiliary member is a spinner rotatably connected to the first cover panel, and upon user interaction with the spinner, the spinner is configured to spin about its connection to the first cover panel to select one of the directive fields.

2. The transaction product of claim 1, wherein the account identifier is a bar code.

3. The transaction product of claim 1, wherein the account identifier includes at least one of a bar code, a magnetic strip, a smart chip, and a radio frequency identification (RFID) device.

4. The transaction product of claim 1, wherein each of the plurality of sections is similarly sized and shaped.

5. The transaction product of claim 1, wherein the intermediate sheet defines a first surface, and each of the first cover panel and the second cover panel is coupled to the first surface of the intermediate sheet.

6. The transaction product of claim 1, wherein the first cover panel covers an entirety of the one of the plurality of sections defining the top of the stack, and the second cover panel covers an entirety of the one of the plurality of sections defining the bottom of the stack.

7. The transaction product of claim 1, wherein the first cover panel and the second cover panel are only indirectly coupled to one another.

8. The transaction product of claim 1, wherein when the intermediate sheet is in the extended position, the one of the plurality of sections that forms the top of the stack and the one of the plurality of sections that forms the bottom of the stack are in opposite corners of the intermediate sheet.

9. The transaction product of claim 1, wherein the account identifier is fixedly connected to the second cover panel opposite the intermediate sheet.

10. The transaction product of claim 1, wherein the intermediate sheet defines a first surface, each of the first cover panel and the second cover panel is coupled to the first surface, and the first surface defines a game board.

11. The transaction product of claim 1, wherein:
the intermediate sheet defines a first surface,
each of the first cover panel and the second cover panel is coupled to the first surface,
the first surface defines a game board, and the transaction product is provided in combination with a backer,
the backer integrally defines one or more game pieces configured to interact with the game board, and
each of the one or more game pieces is configured to be readily removed from a remainder of the backer.

12. A combination comprising:
a transaction product comprising:
a first cover panel;
a second cover panel;
an intermediate sheet configured to be repeatedly folded and unfolded to transition between a collapsed position and an extended position, wherein:
in the extended position, the intermediate sheet is substantially planar and sized substantially larger than a combined size of the first cover panel and the second cover panel;
the intermediate sheet defines a plurality of longitudinally- and laterally-extending fold lines dividing the intermediate sheet into a plurality of sections,
when the longitudinally- and laterally-extending fold lines are folded such that the intermediate sheet is in the collapsed position, the plurality of sections are provided in a stack,
the first cover panel is coupled with one of the plurality of sections that forms a top of the stack,
the second cover panel is coupled with another of the plurality of sections that forms a bottom of the stack,
the intermediate sheet defines a first surface,
each of the first cover panel and the second cover panel is coupled to the first surface,
the first surface defines a game board, and
the first cover panel includes directive fields circumferentially spaced from one another;
a spinner rotatably connected to the first cover panel, wherein upon user interaction with the spinner, the spinner is configured to spin about its connection to the first cover panel to select one of the directive fields that instructs a user to move the one or more game pieces relative to the game board in a specified manner; and
an account identifier coupled with at least one of the first cover panel, the second cover panel, and the intermediate sheet, the account identifier linking the transaction product to an account or record configured to track a value available for use toward a purchase of one or more of goods and services; and
a backer integrally defining one or more game pieces configured to interact with the game board, wherein each of the one or more game pieces is configured to be readily removed from a remainder of the backer.

13. A transaction product comprising:
a first cover panel;
a second cover panel;
an intermediate sheet configured to be repeatedly folded and unfolded to transition between a collapsed position and an extended position, wherein:
in the extended position, the intermediate sheet is substantially planar and sized substantially larger than a combined size of the first cover panel and the second cover panel,
the intermediate sheet defines first and second longitudinally-extending fold lines and a plurality of laterally-extending fold lines dividing the intermediate sheet into a plurality of sections,
when the intermediate sheet is folded along the first and second longitudinally-extending fold lines and along the laterally-extending fold lines, the intermediate sheet is in the collapsed position and the plurality of sections are provided in a stack,
the first cover panel is coupled with one of the plurality of sections that forms a top of the stack, and
the second cover panel is coupled with another of the plurality of sections that forms a bottom of the stack; and
an account identifier coupled with at least one of the first cover panel, the second cover panel, and the intermediate sheet, the account identifier linking the transaction product to an account or record configured to track a value available for use toward a purchase of one or more of goods and services;
wherein the account identifier is included on the first cover panel, and the second cover panel includes a spinner rotatably coupled thereto.

14. The transaction product of claim 13, wherein the intermediate sheet further defines a game board.

15. The transaction product of claim 13, in combination with a database storing the account or record, the database being separate from the transaction product.

16. A combination including:
a transaction product comprising:
a first cover panel,
a second cover panel,
an intermediate sheet configured to be repeatedly folded and unfolded to transition between a collapsed position and an extended position, wherein:
in the extended position, the intermediate sheet is substantially planar and sized substantially larger than a combined size of the first cover panel and the second cover panel;
the intermediate sheet defines a plurality of fold lines dividing the intermediate sheet into a plurality of sections,
when the intermediate sheet is in the collapsed position, the plurality of sections is provided in a stack,
the first cover panel is coupled with one of the plurality of sections that forms a top of the stack, and
the second cover panel is coupled with another of the plurality of sections that forms a bottom of the stack;

a spinner rotatably coupled with the first cover panel opposite the intermediate sheet, and an account identifier coupled with at least one of the first cover panel, the second cover panel, and the intermediate sheet, the account identifier linking the transaction product to an account or record configured to track a value available for use toward a purchase of one or more of goods and services; and a database storing the account or record, the database being separate from the transaction product.

* * * * *